United States Patent [19]

Smeal et al.

[11] Patent Number: 5,500,171
[45] Date of Patent: Mar. 19, 1996

[54] LAMINATING RESINS HAVING LOW ORGANIC EMISSIONS (II)

[75] Inventors: Thomas W. Smeal, Murrysville Boro; George L. Brownell, Mount Lebanon, both of Pa.

[73] Assignee: Aristech Chemical Corporation, Pittsburgh, Pa.

[21] Appl. No.: 205,233

[22] Filed: Mar. 3, 1994

Related U.S. Application Data

[63] Continuation-in-part of Ser. No. 24,022, Mar. 1, 1993, abandoned.

[51] Int. Cl.$^6$ ............................ B29C 41/08; B29C 41/12
[52] U.S. Cl. ............................ 264/309; 264/308; 525/44
[58] Field of Search ............................ 427/202, 206, 427/407.1, 421; 264/308, 309

[56] References Cited

U.S. PATENT DOCUMENTS

| | | | |
|---|---|---|---|
| 3,983,185 | 9/1976 | Dorfman et al. | 260/863 |
| 4,289,684 | 9/1981 | Kallaur | 260/40 R |
| 4,465,806 | 8/1984 | Lee | 525/31 |
| 5,202,366 | 4/1993 | Reid et al. | 523/516 |

FOREIGN PATENT DOCUMENTS 0234692  9/1987  European Pat. Off. .

OTHER PUBLICATIONS

Sartomer Company, West Chester, Pa. 19382; Product Bulletin: Sartomer 348 (Ethoxylated Bisphenol A Dimethacrylate).

Labin, G., *Handbook of Composites* pp. 29, 30 Van Nostrand Reinhold Co. 1982.

*Primary Examiner*—Patricia A. Short
*Attorney, Agent, or Firm*—William L. Krayer

[57] ABSTRACT

A laminating resin is made from (1) an unsaturated polyester resin comprising maleic acid, phthalic acid, and glycol(s), (2) a diacrylate or dimethacrylate of alkoxylated bisphenol-A, and (3) ethylene glycol dimethacrylate. The resin requires no styrene to achieve excellent laminating resin properties, and is significantly inhibited from emitting volatiles during use.

6 Claims, No Drawings

LAMINATING RESINS HAVING LOW ORGANIC EMISSIONS (II)

RELATED APPLICATIONS

This application is a continuation-in-part of our application Ser. No. 024,022, filed Mar. 1, 1993, now abandoned, of the same title.

TECHNICAL FIELD

This invention relates to resin compositions which cure as they are shaped, laminated, brushed, sprayed or otherwise more or less incrementally placed into the space where they are to form a product; such resins are broadly known as laminating resins, commonly have an unsaturated polyester resin base, are mixed with glass fiber reinforcement, and nearly always are employed in a solution of an organic monomer such as styrene. The organic monomer is intended to copolymerize with the resin but typically and notoriously may also tend to volatilize in significant amounts into the workplace environment. The present invention is a composition and method which can be used in existing equipment, procedures, and workplaces, but which will emit far less monomer than the typical laminating resin and method heretofore.

BACKGROUND OF THE INVENTION

Many attempts have been made to devise laminating resins having low volatile emissions and still meet the physical specifications and other desirable properties of the end products, while remaining relatively easy to use. In Lee U.S. Pat. No. 4,465,806, for example, a more or less conventional unsaturated polyester resin is combined with, instead of the usual styrene, a reaction product of a polyepoxy compound and acrylic or methacrylic acid which may be the diacrylate of a polyglycidyl ether of bisphenol-A. These compounds are made from epoxy compounds, and the author of U.S. Pat. No. 4,465,806 requires that a significant portion of the epoxy groups be unreacted for use in their resin. Moreover, unlike the present invention, they form pendant OH groups.

Ethoxylated, difunctional, bisphenol-A has been used in the past as an ingredient in various types of resins, generally resins which include a significant diisocyanate component, as in Ford, Jr. et al U.S. Pat. No. 3,876,726.

European Patent Application 0 234 692 discloses a composition said to be useful as a molding resin, having the virtue of a low residual monomer concentration in the final product. The gist of the disclosure appears to be that dimethacrylates such as ethoxylated bisphenol-A dimethacrylate can be used as components of otherwise more or less conventional unsaturated polyester resins to reduce the amount of residual styrene monomer in contained molding processes such as cell molding, compression molding, and sheet molding. See also Reid and Rex U.S. Pat. No. 5,202,366, which includes a low-profile additive in a similar composition.

The daunting problem of volatile emissions during spray-up or other laminating procedures has until now been unsolved. Applicants' dramatic results detailed herein show that lamination can be used with significantly reduced emissions in the workplace.

SUMMARY OF THE INVENTION

Our new laminating resin comprises three components- The first is a base resin comprising glycols and unsaturated dicarboxylic acids; optionally the base resin may also contain a saturated dicarboxylic acid. In polymeric form, they are typically maleic and phthalic acid residues, with optional isophthalic residues, interspersed with glycol residues. These glycols are commonly ethylene glycol, diethylene glycol, propylene glycol and dipropylene glycol, usually as mixtures, but many other glycols can be utilized; dicyclopentadiene may be included as well, as is known in the art. The second component is a diacrylate or dimethacrylate of alkoxylated bisphenol-A of the formula

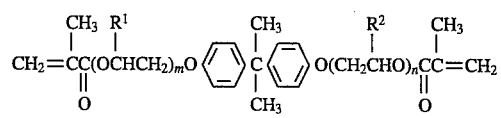

where m and n are independently numbers from 1 to about 10, and $R^1$ and $R^2$ are independently, in each alkoxy group, hydrogen or $CH_3$. Hydroxyethyl or hydroxypropyl groups should comprise about 19–71% of the weight of this ingredient. These two ingredients may be present in weight ratios of about 2.0:1 to about 0.5:1. The composition also includes about 20–60% based on the total of the two above ingredients of ethylene glycol dimethacrylate. The above-described composition may also include from 1% to about 10% of N-vinyl pyrrolidone or 1% to about 20% cyclohexyl methacrylate or both, and/or 1% to about 30% vinyl toluene or divinyl benzene or a mixture thereof. Since our objective is to design a composition which works very well as a laminating resin without significant styrene emissions, the addition of styrene to the recipe defeats that purpose and is not recommended, but the composition will continue to be operable as an excellent laminating resin even though some styrene is included. The composition will also tolerate many other minor ingredients known to be useful in the unsaturated polyester and laminating art. A volatility of 20.0 $g/m^2$ or less, as measured by the test of Section 1162 of the Regulations of the South Coast (California) Air Quality District, was significantly achieved by applicants in the present invention. In fact, applicants' resins all measured under 10.0 $g/m^2$.

DETAILED DESCRIPTION OF THE INVENTION

While the problem at hand is to create a formulation which drastically differs from commercial standard laminating resins in terms of volatile emissions during application, the market dictates that it must be accomplished without significantly altering the widely used equipment and techniques of application. Accordingly, the following criteria are to be kept in mind at all times:

1. Reduced emission of volatile organic compounds—regulations will become more stringent with time.
2. Less potential hazard to human health and the environment—regulations will also become more stringent with time.
3. Minimal increase in cost when commercialized, and reason to believe cost will be reduced in the long run.
4. Compatibility between components of the resin system.
5. Reactivity that is similar to that of styrenated polyester resins.

6. Viscosity that is similar to that of styrenated polyester resins—100 to 400 cps.
7. Physical properties similar to or better than those of styrenated polyester resin.
8. Ability to wet glass and bond to other components of an assembly.

Persons skilled in the art will realize that number 7, relating to physical properties of the final product, can by itself include several important specifications. Thus, the problem is not simply one of finding a monomer which is not as volatile or objectionable as styrene. Rather, many criteria have to be balanced, and, with thousands of chemicals to consider, analysis of the combinations and their effects is extremely difficult. One must decide on the important functions and properties, settle on a systematic but simple screening process, and try to develop a short list of prospective formulations which have a good chance of meeting all the criteria within a practical time period.

The proliferation of input variables to attain these objectives may be further appreciated by considering the more or less conventional unsaturated polyester compositions which may be used as a base. They are prepared by polycondensation of polycarboxylic acid derivatives, one of which must be an alpha, beta-ethylenically unsaturated polycarboxylic acid, and polyols. By polycarboxylic acid derivatives we mean to include polycarboxylic acids, their esters of lower alcohols, their acid chlorides and their anhydrides.

The ratio of polycarboxylic acid to polyol is usually a 1:1 molar ratio. However, in most esterification processes, a slight excess of polyol is utilized to compensate for polyol losses during esterification. Also, although dicarboxylic acids and diols are most frequently utilized and the 1:1 molar ratio is prevalent, the utilization of triols and the like requires the ratio of acid to polyol to be stated more precisely as one equivalent of acid per equivalent of polyol.

The unsaturated polyesters useful in this invention may be prepared from an acid mixture wherein the unsaturated polycarboxylic acid comprises as little as 20 mole percent of the total acids present, although it is generally preferred that the unsaturated polycarboxylic acid comprises about 30% or more of the total acid content.

Some of the unsaturated polycarboxylic acids useful in preparing unsaturated polyesters used in this invention include:

| | |
|---|---|
| Maleic acid | Citraconic acid |
| Fumaric acid | Glutaconic acid |
| Itaconic acid | Chloromaleic acid |
| Mesaconic acid | | and the like, wherein the term "acid" is used to include the corresponding anhydrides where such anhydrides exist.

Some of the saturated and aromatically unsaturated polycarboxylic acids optionally useful in preparing unsaturated polyesters used in this invention include:

| | |
|---|---|
| Phthalic acid | Isophthalic acid |
| Tetrahydrophthalic acid | Hexahydrophthalic acid |
| Endomethylene tetra-hydrophthalic acid | |
| Tetrachlorophthalic acid | Glutaric acid |
| Hexachloroendomethylene tetrahydrophthalic acid | |
| Succinic acid | Suberic acid |
| Adipic acid | Sebacic acid | and the like, wherein the term "acid" includes the corresponding anhydrides where such anhydrides exist.

Polyols useful in preparing polyesters for use in this invention are polyfunctional alcohols of the type conventionally utilized in polyester preparation. Such polyols include:

| | |
|---|---|
| Ethylene glycol | 1,5 propanediol |
| Propylene glycol | Triethylene glycol |
| Butylene glycol | Glycerol |
| Diethylene glycol | 1,4,6-hexanetriol |
| Trimethylolpropane | Trimethylolethane |
| Dipropylene glycol | Pentaerythritol |
| Neopentyl glycol | |
| Alkoxylated 2,2-bis-(4-hydroxyphenyl) propane | | and the like. Although diols are generally preferred in the preparation of unsaturated polyesters, the more functional polyols, i.e. polyols having a functionality of three to five, are sometimes used.

In addition, dicyclopentadiene may be included and may be considered a normal part of the "base resin" as used herein.

During the development of the formulation, various monomers and monomer substitutes were screened, using two different "base" resins—one having dicyclopentadiene as a major ingredient and one without dicyclopentadiene. Following are results for the base resin without dicyclopentadiene:

A base resin composition (hereafter designated "Resin A") was prepared having the following ingredients:

| | |
|---|---|
| Base Resin* | 60 parts by weight |
| 12% Cobalt (Promoter) | 00.30 |
| Potassium (Co-promoter) | 00.20 |
| N,N-Dimethylacetoacetamide (Accelerator) | 00.30 |
| DDM-9 (Initiator) | 01.50 |
| Monomer (as indicated below) | 40 |

| *Base Resin (Polymer) | Parts by weight | lbs/100 lbs | lbs/60 lbs |
|---|---|---|---|
| Propylene Glycol | 22.788 | 31.97 | 19.18 |
| Diethylene Glycol | 04.937 | 6.93 | 4.16 |
| Phthalic Anhydride | 32.734 | 45.92 | 27.55 |
| Maleic Anhydride | 10.820 | 15.18 | 9.11 |
| | 71.279 | 100.00 | 60.00 |

The following "monomers" were utilized with Resin A:

| Monomer | Mod L[1)] | Viscosity | Exotherm °F. | Gel Time min:sec | Interval min:sec |
|---|---|---|---|---|---|
| Styrene | 0.120 | low | 335 | 4:30 | 4:39 |
| Vinyl Toluene | 0.120 | low | 317 | 4:50 | 5:04 |
| Diallyl phthalate | 0.000 | high | 119 | 19:27 | 27:43 |
| Methacrylates | | | | | |
| n-butyl | 0.001 | low | 186 | 40:58 | 5:28 |
| n-hexyl | 0.001 | incompatible | | | |
| isodecyl | 0.001 | incompatible | | | |
| cyclohexyl | 0.001 | high* | 287 | 16:50 | 3:50 |
| 2-phenoxyethyl | 0.001 | high | 196 | 8:45 | 3:29 |
| allyl | 0.001 | low | 331 | 18:20 | 3:37 |
| 2-hydroxyethyl | 0.001 | low | 247 | 4:48 | 3:35 |
| 2-hydroxyethyl | 0.010 | low | 249 | 4:30 | 3:20 |
| dicyclopentyl | 0.001 | very high | 199 | 3:40 | 4:11 |

-continued

| Monomer | Mod L[1] | Viscosity | Exotherm °F. | Gel Time min:sec | Interval min:sec |
|---|---|---|---|---|---|
| isobornyl | 0.000 | incompatible | | | |
| isophoronyl | 0.010 | incompatible | | | |
| Dimethacrylates | | | | | |
| 1,6-hexanediol | 0.001 | high | 241 | 7:54 | |
| ethylene glycol (EG) | 0.001 | low | 275 | 2:48 | 3:37 |
| ethylene glycol | 0.005 | low | 274 | 2:52 | 3:50 |
| diethylene glycol | 0.001 | medium | >210 | 4:03 | 2:12 |
| diethylene glycol | 0.010 | medium | 252 | 5:40 | 3:13 |
| triethylene glycol | 0.001 | medium | 241 | 3:18 | 3:17 |
| tetraethylene glycol | 0.001 | medium | 229 | 2:52 | 3:46 |
| neopentyl glycol | 0.001 | high | 235 | 4:20 | 4:09 |
| ethoxylated BPA | 0.001 | very high | 171 | 8:50 | 7:30 |
| C14 diol | 0.001 | incompatible | | | |
| Trimethacrylate | | | | | |
| trimethylol propane | 0.001 | high | 228 | 2:28 | |
| Mixtures | | | | | |
| 30 EG dimethacrylate/ 10 N-vinyl pyrrolidinone | 0.010 | medium | 295 | 1:49 | 3:12 |
| 30 EG dimethacrylate/ 10 divinyl benzene | 0.010 | medium | 286 | 3:11 | 3:29 |
| 30 vinyl toluene/ 10 N-vinyl pyrrolidinone | 0.200 | low | 289 | 16:10 | 4:44 |

*This was considered unsatisfactory, but when ethoxylated BPA dimethacrylate was included to make a 3-part mixture, viscosity was lowered. Of all the above substitutions for monomer, only the N-vinyl pyrrolidinone, divinyl benzene, ethylene glycol dimethacrylate, cyclohexyl methacrylate, and vinyl toluene were not ruled out. The rest were eliminated from consideration because they were slow to react with polyester as shown by long gel time and/or low exotherm or they were not sufficiently compatible with polyester as shown by high viscosity or the outright failure to dissolve.
[1] Mod L is 25% hydroquinone in propylene glycol.

Liquid resin properties measured in the experiments reported below were gel time, (reported in the tables herein in minutes and seconds, as 13:17, for example), room temperature interval time, which is the time between gelation and the exothermic peak, room temperature exothermic peak which is the highest temperature reached in a 100 g mass of resin during the curing process, Brookfield viscosity, and Barcol hardness by ASTM D2583. For volatile emissions, we followed the Rule 1162 Standard Method for Static Volatile Emissions of the South Coast Air Quality Management District (California) which is incorporated herein by reference. This test is accepted as a predictor of volatile emissions in the workplace during spray-up lamination procedures. Its results are reported in two ways—grams per square meter of weight loss, and the time of emissions, in minutes and seconds. The latter measurement entails noting the point in time in which weight loss is no longer recorded, thus requiring that weight be monitored beyond the time noted.

The test requirements are as follows: An environment at 77° C. and 50% relative humidity is maintained. If a controlled environment is not available, conditions should be reported for which measurements are made. A 200 gm pre-promoted resin is weighed out into a suitable dry and clean container. The container is covered and placed in a 25° C. temperature bath. A balance is placed in a draft free enclosure. A gallon lid is cleaned with solvent and wiped dry. The diameter is measured to the nearest 0.1 cm. The gallon lid is placed on an inverted paper or plastic cup mounted on the balance pan. A bent paper clip is positioned in the center of the gallon lid. This weight (TARE WEIGHT) is recorded. The container is taken from the temperature bath and an appropriate volumetric or weight measure of catalyst is added. A timer is started at this point. The catalyst is mixed with the resin for one minute. The INITIAL WEIGHT is determined by pouring $100.0 \pm 0.5$ gm of catalyzed resin into the can lid and recording the weight. Next, the paper clip is used to determine when the resin has hardened sufficiently to allow the resin or lid to be lifted. The time (gel time) is recorded at this point. The resin is then allowed to harden in the can lid and every 15 minutes it is reweighed until concurrent weights agree to within 0.05 gm. This is recorded as the FINAL WEIGHT. The entire procedure should be repeated until duplicate samples agree to the nearest 5 $gm/m^2$.

The volatile emissions per square meter are calculated as follows:

$$\text{Volatile Losses per Square Meter} = \frac{\text{INITIAL WEIGHT} - \text{FINAL WEIGHT}}{\text{Area of Sample in Square Meters}}$$

The clear castings tests adopted were as follows:
1. Tensile strength—ASTM D638.
2. Tensile modulus—ASTM D638.
3. Elongation—ASTM D638.
4. Flexural strength—ASTM D790.
5. Flexural modulus—ASTM D790.
6. Heat deflection temperature ASTM D648.
7. Water absorption at 150° F.—ASTM D570 (modified).

The water absorption test was modified as follows: the temperature was set at 150° F. and long term immersion was set at one week. In the data reported in Table I, Resin A is as described above in terms of weight; it is, in molar equivalents, a polyester resin composed of 1.0 mole maleic anhydride, 2.0 moles phthalic anhydride, 0.42 mole diethylene glycol and 2.71 moles propylene glycol. Resin B is similar to Resin A with a lower viscosity by an adjustment of the cook, as is known in the art. Sartomer CD480 is ethoxylated bisphenol-A dimethacrylate where m and n in the above formula total 10. Sartomer 348 is ethoxylated bisphenol-A dimethacrylate where m and n in the above formula are both 1. Mod L is 25% hydroquinone and 75% propylene glycol.

From the data in Table I, it can be seen that formulations S and O have better than acceptable resin properties and clear casting properties, and have volatile emissions far less than the rate of the more or less classical commercial resin A2.

In Tables II and III, nine additional formulations are shown. From these it will be seen that cyclohexyl methacrylate causes undesirable properties when used as the only material in addition to the base resin and the ethoxylated BPA dimethacrylate. But there are extraordinarily low emissions from all nine of the formulations. The use of vinyl toluene to reduce the viscosity is certainly not detrimental to emissions results.

TABLE I

| RESIN | A2 | C2 | S | Z | A1 | O |
|---|---|---|---|---|---|---|
| Resin A | 60.00 | 60.00 | 40.00 | 35.00 | 35.00 | — |
| Resin B | — | — | — | — | — | 45.00 |
| Sartomer CD480 | — | — | 15.00 | 15.00 | 15.00 | 10.00 |
| Sartomer 348 | — | — | 20.00 | 20.00 | 20.00 | 15.00 |
| EG Dimethacrylate | — | — | 25.00 | 10.00 | 20.00 | 30.00 |
| Vinyl Toluene | — | 40.00 | — | 10.00 | — | — |
| Cyclohexyl Methacrylate | — | — | — | 10.00 | — | — |
| Divinyl Benzene | — | — | — | — | 10.00 | — |
| Styrene | 40.00 | — | — | — | — | — |
| Mod L | 0.20 | 0.22 | 0.06 | 0.12 | 0.12 | 0.06 |
| RESIN PROPERTIES | | | | | | |
| Gel time, min:sec | 12:59 | 13:17 | 21:18 | 18:29 | 11:30 | 5:20 |
| Interval, min:sec | 5:58 | 6:54 | 4:32 | 4:11 | 3:26 | 3:19 |
| Exotherm peak, °F. | 345 | 324 | 249 | 276 | 294 | 245 |
| Viscosity, cps, 75° F. | 315 | 340 | 1,390 | 426 | 624 | 396 |
| 1162 Emissions, G/M2 | 31.5 | 20.6E | 3.6 | 6.1 | 9.7 | 3.6 |
| Barcol hardness | | | | | | |
| 45 minutes | 45 | 42 | 47 | 44 | 52 | 34 |
| One hour | 45 | 43 | 50 | 48 | 53 | 36 |
| 24 hours | 49 | 49 | 32 | 51 | 54 | 36 |
| CLEAR CASTING PROPERTIES | | | | | | |
| Tensile strength, psi | 9,308 | 7,555 | 8,069 | 9,635 | 8,176 | 10,179 |
| Ten. modulus, 10-5 psi | 0.549 | 0.534 | 0.466 | 0.565 | 0.575 | 0.567 |
| Elongation, % | 1.9 | 1.6 | 3.2 | 2.7 | 1.9 | 2.3 |
| Flexural strength, psi | 16,008 | 15,317 | 10,475 | 16,889 | 15,780 | 16,013 |
| Flex modulus, 10-5 psi | 0.586 | 0.573 | 0.322 | 0.444 | 0.482 | 0.498 |
| Heat deflect. temp, °F. | 144 | 138 | 169 | 142 | 147 | 141 |
| Water absorption, % at 150° F. | | | | | | |
| One day | 0.89 | 0.91 | 1.01 | 1.19 | 1.26 | 1.43 |
| 7 days | 1.89 | 1.89 | 2.12 | 1.65 | 1.76 | 2.14A |

E - This value was estimated based on the difference in results caused by using different and points tor the 1162 test.
A - The surfaces of the test specimens were alligatored. This indicates a sore severe problem than the weight gain indicates.

TABLE II

Low VOC Laminating Resins Based on General Purpose Polyester Polymer

| Resin | E-3B | F-3 | G-3 | H-3 | I-3 |
|---|---|---|---|---|---|
| Composition | | | | | |
| Resin A | 35.00 | 35.00 | 35.00 | 35.00 | 35.00 |
| Sartomer 480 | 15.00 | 15.00 | 15.00 | 15.00 | 15.00 |
| Sartomer 348 | 20.00 | 20.00 | 20.00 | 20.00 | 20.00 |
| EG Dimethacrylate | — | 15.00 | — | 15.00 | 20.00 |
| Cyclohexyl Methacrylate | 30.00 | 15.00 | 15.00 | — | 05.00 |
| Vinyl Toluene | — | — | 15.00 | 15.00 | 05.00 |
| Mod L | 00.00 | 00.00 | 00.17 | 00.17 | 00.06 |
| 12% Cobalt | 00.30 | 00.30 | 00.30 | 00.30 | 00.30 |
| 16% Potassium | 00.20 | 00.20 | 00.20 | 00.20 | 00.20 |
| Dimethyl Acetoacetamide | 00.30 | 00.30 | 00.30 | 00.30 | 00.30 |
| Resin Properties | | | | | |
| Gel Time, min:sec | 48:00 | 27:55 | 33:52 | 25:10 | 30:40 |
| Interval, min:sec | 10:49 | 05:01 | 07:07 | 03:51 | 05:23 |
| Exotherm, °F. | 229 | 239 | 244 | 291 | 258 |
| Viscosity, cps @ 75° F. | 1,280 | 1,085 | 560 | 650 | 930 |
| Barcol-45 minutes | 00.0 | 31.7 | 00.0 | 00.0 | 26.6 |
| one hour | 00.0 | 47.3 | 29.7 | 47.0 | 48.7 |
| two hours | 00.0 | 48.6 | 45.6 | 50.8 | 51.0 |
| three hour | 00.0 | 48.2 | 45.9 | 49.8 | 51.1 |
| four hours | 00.0 | 48.6 | 46.0 | 50.3 | 51.2 |
| 24 hours | 38.2 | 48.4 | 47.2 | 50.7 | 51.5 |
| 1162 Emissions, G/M2 | 2.4 | 6.1 | 3.6 | 4.2 | 3.0 |
| Emissions, min:Sec | 60:55 | 36:42 | 53:46 | 29:15 | 36:18 |
| Properties of a Clear Casting | | | | | |
| HDT, °F. | 129 | 138 | 138 | 159 | 163 |
| Tensile Strength, psi | 9,290 | 8,980 | 9,580 | 9,140 | 6,050 |
| Ten modulus, 10-5 psi | 0.451 | 0.481 | 0.485 | 0.544 | 0.587 |
| Elongation, % | 3.10 | 2.40 | 2.50 | 2.00 | 1.20 |
| Flexural Strength, psi | 14,400 | >16,130 | 18,400 | 19,660 | 17,150 |
| Flex modulus, 10-5 psi | 0.488 | 0.520 | 0.662 | 0.664 | 0.633 |
| Water Absorption @ 150° F. | | | | | |
| 24 hours | 1.06 | 1.08 | 1.07 | 0.95 | 1.07 |
| seven days | 2.43 | 2.19 | 1.78 | 1.84 | 2.06 |

TABLE III

Low VOC Laminating Resins Based on General Purpose Polyester Polymer

| Resin | U-3 | ZA | V-3 | Z | Q-4 |
|---|---|---|---|---|---|
| Composition | | | | | |
| Resin A | 35.00 | 35.00 | 35.00 | 35.00 | 30.00 |
| Sartomer 480 | 15.00 | 15.00 | 15.00 | 15.00 | 20.00 |
| Sartomer 348 | 20.00 | 20.00 | 20.00 | 20.00 | 20.00 |
| EG Dimethacrylate | 15.00 | 10.00 | — | 10.00 | 30.00 |
| Cyclohexyl Methacrylate | 05.00 | 10.00 | — | 10.00 | — |
| Vinyl Toluene | 10.00 | 10.00 | 30.00 | 10.00 | — |
| Mod L | 00.13 | 00.06 | 00.20 | 00.12 | 00.10 |
| 12% Cobalt | 00.30 | 00.30 | 00.30 | 00.30 | |
| 16% Potassium | 00.20 | 00.20 | 00.20 | 00.20 | |
| Dimethyl Acetoacetamide | 00.30 | 00.30 | 00.30 | 00.30 | |
| Resin Properties | | | | | |
| Gel Time, min:sec | 38:05 | 38:15 | 37:36 | 18:29 | 14:10 |
| Interval, min:sec | 06:07 | 07:37 | 09:49 | 04:11 | 4:38 |
| Exotherm, °F. | 277 | 277 | 273 | 276 | 233 |
| Viscosity, cps @ 75° F. | 790 | 710 | 382 | 426 | 400 |
| Barcol-45 minutes | 00.0 | 00.0 | 00.0 | 44.0 | 50.1 |

TABLE III-continued

Low VOC Laminating Resins Based on General Purpose Polyester Polymer

| Resin | U-3 | ZA | V-3 | Z | Q-4 |
|---|---|---|---|---|---|
| one hour | 37.0 | 32.2 | 39.9 | 48.0 | 51.9 |
| two hours | 48.6 | 47.2 | 46.0 | — | 52.1 |
| three hour | 48.5 | 47.6 | 46.2 | — | 52.1 |
| four hours | 48.5 | 47.8 | 46.9 | — | 52.1 |
| 24 hours | 48.5 | 48.7 | 46.9 | 51.0 | 52.1 |
| 1162 Emissions, G/M2 | 7.3 | 2.4 | 1.8 | 6.1 | 0.6 |
| Emissions, min:Sec | 44:22 | 48:20 | 51:35 | — | 16:00 |
| Properties of a Clear Casting | | | | | |
| HDT, °F. | 136 | 138 | 138 | 142 | 210 |
| Tensile Strength, psi | 10,120 | 10,370 | 9,500 | 9,635 | 5,660 |
| Ten modulus, 10–5 psi | 0.489 | 0.540 | 0.501 | 0.565 | 0.516 |
| Elongation, % | 2.70 | 2.60 | 2.30 | 2.70 | 1.30 |
| Flexural Strength, psi | 18,750 | 19,410 | >19,150 | 16,889 | 14,550 |
| Flex modulus, 10–5 psi | — | — | — | 0.444 | 0.508 |
| Water Absorption @ 150° F. | | | | | |
| 24 hours | 1.06 | 1.04 | 0.81 | 1.19 | |
| seven days | 1.78 | 1.87 | 1.43 | 1.65 | |

Based on experimental work performed subsequent to the filing of the parent application Ser. No. 024,022, ethylene glycol dimethacrylate is useful in our composition and method. Accordingly, our invention comprises a composition comprising (a) the base polyester polymer (resin) as described above and the alkoxylated bisphenol-A diacrylate or dimethacrylate in a ratio of 2:1 to 0.5:1 and (b) about 20% to about 60%, based on the total of (a) and (b), of ethylene glycol dimethacrylate. In Tables I, II, and III, the various "Sartomer" compositions, i.e. the ethoxylated bisphenol-A dimethacrylates, have 2 and 10 ethoxy groups on both sides of the bisphenol-A; however, we may employ a single compound or compounds having any variation of combinations of ethoxy or propoxy groups from two to about 20 groups, preferably a total of 2 to 8 alkoxy groups.

We claim:

1. Method of laminating a solid formed body comprising (a) providing a forming surface having a desired positive or negative shape, (b) providing a liquid mixture comprising (1) about two parts by weight unsaturated polyester resin, (2) about one part to about four parts by weight alkoxylated bisphenol-A diacrylate or dimethacrylate, (3) about 20% to about 60%, based on the total weight of (1) and (2), of ethylene glycol dimethacrylate, and (4) an effective amount of a polymerization catalyst, (c) applying said mixture to said forming surface at ambient temperatures in layers while permitting said layers incrementally to polymerize, thereby building said shaped article, and wherein no more than 20.0 g/m$^2$ of volatile emissions as measured by Section 1162 of the Regulations of the South Coast (California) Air Quality District are created, and (d) removing the finished solid formed body from said forming surface.

2. Method of claim 1 wherein the alkoxylated BPA is a dimethacrylate and has about 2 to about 20 alkoxy groups.

3. Method of claim 1 wherein said mixture is applied by spraying.

4. Method of claim 1 wherein said mixture includes glass fibers.

5. Method of claim 2 wherein said alkoxy groups are ethoxy groups.

6. Method of making a shaped article comprising (a) repeatedly applying to a form under polymerization conditions, a liquid laminating resin comprising (1) about two parts by weight unsaturated polyester resin, (2) about one to about four parts by weight alkoxylated bisphenol-A diacrylate or dimethacrylate, (3) about 20% to about 60%, based on the total weight of (1) and (2), of ethylene glycol dimethacrylate, and (4) an effective amount of a polymerization catalyst; and (b) permitting said resin to polymerize, wherein a shaped article is manufactured, and wherein no more than 20.0 g/m$^2$ as measured by Section 1162 of the Regulations of the South Coast (California) Air Quality District are created.

* * * * *